US009929965B1

(12) United States Patent
Ravindranath Tagore

(10) Patent No.: US 9,929,965 B1
(45) Date of Patent: *Mar. 27, 2018

(54) TRAFFIC-AWARE SAMPLING RATE ADJUSTMENT WITHIN A NETWORK DEVICE

(71) Applicant: Juniper Networks, Inc., Sunnyvale, CA (US)

(72) Inventor: Kalyana Prakash Ravindranath Tagore, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 200 days.

This patent is subject to a terminal disclaimer.

(21) Appl. No.: 15/005,740

(22) Filed: Jan. 25, 2016

Related U.S. Application Data

(63) Continuation of application No. 14/308,650, filed on Jun. 18, 2014, now Pat. No. 9,246,828.

(51) Int. Cl.
*H04L 12/825* (2013.01)

(52) U.S. Cl.
CPC .................... *H04L 47/25* (2013.01)

(58) Field of Classification Search
None
See application file for complete search history.

(56) References Cited

U.S. PATENT DOCUMENTS

| | | | |
|---|---|---|---|
| 3,962,681 A | 6/1976 | Requa et al. | |
| 4,032,899 A | 6/1977 | Jenny et al. | |
| 4,600,319 A | 7/1986 | Everett, Jr. | |
| 5,408,539 A | 4/1995 | Finlay et al. | |
| 6,011,795 A | 1/2000 | Varghese et al. | |
| 6,018,765 A | 1/2000 | Durana et al. | |
| 6,499,088 B1 | 12/2002 | Wexler et al. | |
| 6,751,663 B1 | 6/2004 | Farrell et al. | |
| 7,185,103 B1 | 2/2007 | Jain | |
| 9,246,828 B1 * | 1/2016 | Tagore | H04L 47/25 |
| 2001/0055276 A1 | 12/2001 | Rogers | |
| 2002/0141343 A1 | 10/2002 | Bays | |
| 2003/0120769 A1 | 6/2003 | McCollom et al. | |
| 2003/0214913 A1 | 11/2003 | Kan et al. | |
| 2008/0044181 A1 | 2/2008 | Sindhu | |

OTHER PUBLICATIONS

U.S. Appl. No. 14/308,650, filed Jun. 18, 2014 "Traffic-Aware Sampling Rate Adjustment Within a Network Device".

* cited by examiner

*Primary Examiner* — Huy D Vu
*Assistant Examiner* — Bao G Nguyen
(74) *Attorney, Agent, or Firm* — Shumaker & Sieffert, P.A.

(57) ABSTRACT

Techniques are described for providing traffic-aware sampling rate adjustment within network devices. As inbound packets are received at an interface, a sampling unit of a forwarding circuit of the network device samples the inbound packets at a current sampling rate and directs a subset of the inbound packets to a service card of the network device. A flow controller within the service card of the network device processes the subset of the inbound packets to generate flow records. When changes in the rate at which the inbound packets are received exceed a defined threshold, the flow controller adjusts the current sampling rate at which the forwarding circuit samples the inbound packets received at the interface. Moreover, the flow controller adaptively adjusts the sampling rate such that the flow sampling resources the device are being utilized in accordance with the utilization thresholds.

13 Claims, 3 Drawing Sheets

TRAFFIC-AWARE SAMPLING RATE ADJUSTMENT WITHIN A NETWORK DEVICE

This application is a continuation of U.S. application Ser. No. 14/308,650, filed Jun. 18, 2014, the entire contents of which is incorporated herein by reference.

TECHNICAL FIELD

The invention relates to computer networks and, more particularly, to sampling traffic within a computer network.

BACKGROUND

A computer network is a collection of interconnected computing devices that exchange data and share resources. In a packet-based network, the computing devices communicate data by dividing the data into small blocks called packets. Devices within the network, such as routers and switches, forward the packets through the network from a source device to a destination device. The destination device extracts the data from the packets and assembles the data into its original form.

Various protocols exist that allow the intermediate networks devices, such as the routers and switches, to collect and report traffic statistics. For example, the network devices deploy sampling mechanisms that collect traffic statistics on interfaces of the device where traffic is received and/or transmitted. In accordance with the protocols, the network device may periodically export records containing traffic statistics to a centralized device referred to as a packet flow collector of "flow collector." In many network environments, the flow collector may receive traffic flow information via traffic flow packets sent from various network locations. Consequently, a network administrator can use the packet flow collector to analyze overall network traffic flow. Example protocols for reporting traffic records to a flow collector include NetFlow® by Cisco Systems® and JFlow® by Juniper Networks®.

In general, the sampling mechanisms provided by network devices allow only a static, pre-defined sampling rate to be configured. In other situations, the sampling mechanism may use a random sampling rate.

SUMMARY

In general, techniques are described for providing traffic-aware sampling rate adjustment within network devices, such as routers, switches, firewalls or other devices commonly used as network infrastructure.

In one example, a network device comprises a distributed forwarding plane having a plurality of packet forwarding engines coupled by switch fabric. Each of the packet forwarding engines comprises a plurality of interfaces configured to send and receive packets, a forwarding integrated circuit to switch packets between the packet forwarding engines in accordance with forwarding information, and a sampling unit to sample inbound packets received on the interfaces in accordance with sampling rates for the interfaces. The network device includes a service plane having at least one service card, the service card having a flow controller that receives sampled packets from the sampling units and generates flow records in accordance with sampled packets. The sampling units monitor for changes in respective current packet rates at which the inbound packets are received on the interfaces of the packet forwarding engines and output messages informing the flow controller upon detecting changes in the current packet rates for the inbound packets on any of the interfaces that exceeds a threshold change in rate. In response to receiving a message indicating a change in rate for the inbound packets for one of the interfaces, the flow controller within the service plane computes an updated sampling rate for the interface for which the change in rate was detected and outputs a message to the forwarding plane to adjust the sampling rate applied by the sampling unit to the respective interface.

A method comprises receiving, with a network device and at a current packet rate, inbound packets at an interface of the network device and sampling the inbound packets with a sampling unit of a forwarding circuit of the network device at a current sampling rate to direct a subset of the inbound packets to a service card of the network device. The method further comprises processing, with a flow controller within the service card of the network device, the subset of the inbound packets to generate flow records. In response to a change in the current packet rate at which the inbound packets are received at the interface, the flow controller adjusts the current sampling rate at which the forwarding circuit samples the inbound packets received at the interface.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
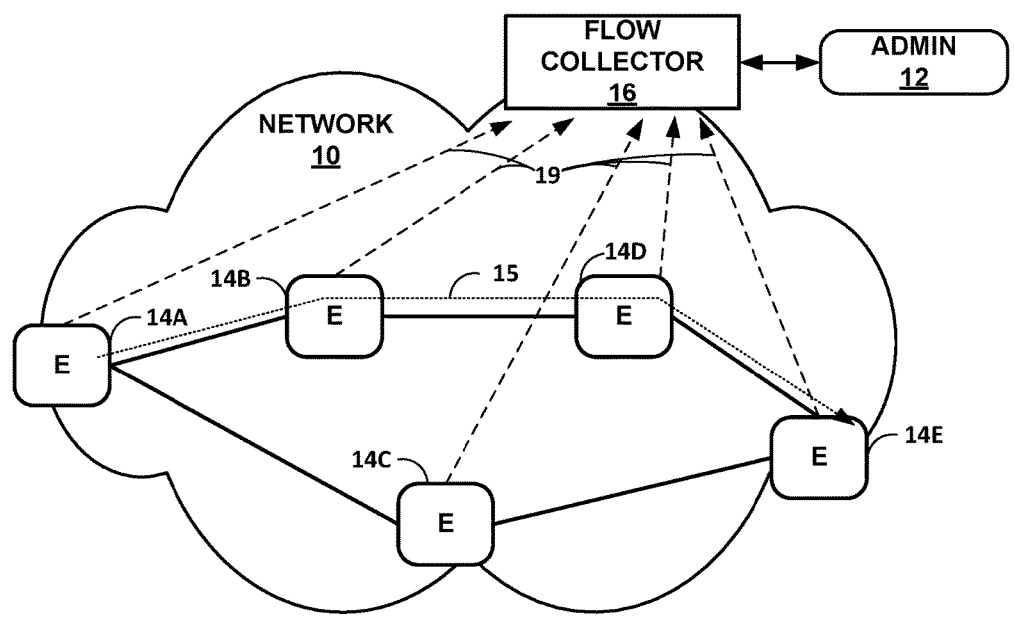
FIG. 1 is a block diagram illustrating a network in which network devices utilize traffic-aware sampling rate adjustment to collect and report traffic statistics.

FIG. 1 illustrates an exemplary system 10 having a number of network elements ("E" in FIG. 1) 14A-14E, hereafter network elements 14. As shown in FIG. 1, each network element 14 generates traffic flow records and transmits the traffic flow records to flow collector 16. Network elements 14 may comprise dedicated computers, specialized devices, or virtual machines providing network services, such as network routers, gateways, switches, firewalls, hubs, servers, VPN appliances or other network devices that forward or otherwise provide services to traffic flows.

Network 6 may represent any type of packet-switched network, such as a service provider network, a customer network, an access network, a local area network (LAN), a wide area network (WAN) or combinations thereof. Moreover, network 6 may be formed by an interconnected group of autonomous systems, each representing an independent administrative domain having a variety of networked resources capable of packet-based communication. Alternatively, network 6 may correspond to a single autonomous system that may or may not be connected to other autonomous systems. In any case, network 6 may include a variety of network elements 14 coupled to one another via communication links.

Each packet flow within network 10, such as packet flow 15, may be identified by, for example, a unique set of characteristics. In one example, packet flows may be identified by five tuple information extracted from headers of packets within the packet flow, where the five tuple includes a source network address, a destination network address, a source port, a destination port and a communication protocol associated with the packet flow. The term "packet" is used herein to generally describe a unit of data communicated between network devices in conformance with a packet-based communication protocol. The principles of the invention are readily applicable to systems implementing any of a variety of protocols, such as the Transmission Control Protocol (TCP), the User Datagram Protocol (UDP), the Internet Protocol (IP), Asynchronous Transfer Mode, Frame Relay, and the like. Accordingly, "packet" is used to encompass any such unit of data, and may be interchanged with the term "cell," or other similar terms used in such protocols to describe a unit of data communicated between resources within the network.

Network elements 14 may include one or more traffic flow modules (not shown in FIG. 1) that accumulate flow statistics for traffic within network 6. More specifically, network elements 14 receive or otherwise capture packets from one or more links within network 6, and compute flow statistics indicative of packet flows (e.g., packet flow 15) over the links. As network elements 14 receive packets, the traffic flow modules within the network elements update counters and compute statistics for the packets flows based on the specific packets received for respective packet flows. For example, the traffic flow modules within network elements 14 may maintain, for each flow, a packet count, byte count, source IP address, destination IP address, next hop IP address, input interface information, output interface information, total octets sent, flow start time, flow end time, source and destination port numbers, TCP flags, IP type of service, originating AS, source address prefix mask bits, destination address prefix mask bits, or the like, for each packet flow. The traffic flow modules output flow records 19 to flow collector 16 to communicate the flow statistics compiled by each network element 14.

The phrase "traffic flow record" is used herein to describe a packet or set of packets having payloads that specifically includes traffic flow information. As one example, traffic flow records may correspond to "cflowd" packets generated according to a flow analysis tool such as NetFlow™ created by Cisco Systems. The Cooperative Association for Internet Data Analysis (CAIDA) has also developed flow analysis tools for analyzing cflowd packets. As outlined in greater detail below, these or other traffic flow records that include traffic flow information in the payload can be computed and exported for transmission in manner consistent with the techniques described herein.

The traffic flow modules within each of network elements 14 may provide internal accounting capabilities for maintaining accurate flow statistics for all of the packets received by network elements 14. For example, the traffic flow modules may monitor and generate statistics for high traffic rates, even core traffic rates of the Internet, including but not limited to OC-3, OC-12, OC-48, OC-192 and higher or lower rates. The particular packet flows being monitored may be defined by source and/or destination network addresses. Additionally, other routing information within packets may readily be used to define the packet flows for which flow statistics are maintained, such as MPLS labels, VPN labels, Class of Service (CoS) information, and the like. In this manner, statistics for particularized packet flows can be maintained to a level of granularity desired for effective traffic analysis.

As noted above, network elements 14 periodically communicate traffic flow records 19 to flow collector 16, each of the traffic flow records 19 carrying traffic flow information accumulated by the respective network element. Traffic flow records 19 may include statistical data for each packet flow processed by network elements 14, such as a number of packets, a number of bytes, a time of capturing a first packet for the flow, a time of capturing a most recent packet for the flow, an incoming interface, an outgoing interface, a source/destination network mask, a source/destination Autonomous System (AS) number, or the like.

Flow collector 16 receives traffic flow records 19 sent by network elements 14 and updates an accounting system or other database in accordance with the received traffic flow records. That is, flow collector 16 receives traffic flow records 19 from network elements 14 and stores the traffic flow information carried by the traffic flow records within a database or other suitable data structure. In addition, flow collector 16 or other analysis tools may analyze the received traffic flow records 19 to aid system administrator 12 ("Admin" 12) in identifying any suspicious packet flows. For example, the traffic flow statistics may be analyzed for traffic engineering purposes or to identify packet flows that may represent network threats, such as Denial of Service (DOS) attacks. In this manner, analysis of traffic flows through network 6 can improve network reliability and be used to reduce the potential for security breaches or other network events.

As described herein, network elements 14 may provide traffic-aware sampling rate adjustment. In general, each of network elements 14 samples inbound traffic for their interfaces at a current sampling rate for the interface. In accordance with the techniques described herein. Each of network elements 14 may dynamically adjusts the sampling rate in a traffic-aware fashion responsive to changes in traffic load experienced by the individual network element. Moreover, the techniques described herein allow network elements 14 to implement adaptive, traffic-aware sampling in a predictable, deterministic manner.

For example, rather than utilize a static, pre-defined sampling setting, such as sampling configuration value of "1000," which indicates that that one packet per thousand on an interface is sampled, network elements utilize, network elements 14 adapt sampling rates to actual traffic conditions. That is, rather than use sampling rates that are constant with respect to the actual rate at which packets are received, network elements 14 may adapt the sampling rates based on the actual packet rates. In some situations, each network element 14 may tune the sampling rates for their collection of interfaces so as to increase the performance that the network element is able to provide.

In one example implementation, network elements 14 dynamically adjust the sampling rate based on user-configurable traffic load zones or ranges. That is, in this example, each network element 14 stores configuration data specifying one or more zones in terms of actual current traffic load, e.g., current packets per second received on a given interface. Based on the measured current traffic load on each of its interfaces, each network element 14 dynamically adjusts the respective sampling rate for each of its interfaces. In the example illustrated in Table 1, configuration data defines three zones in terms of the rate of incoming-traffic: (1) Peak having a rate range defined as greater than 3 gigabits per second (Gps), (2) Normal having a rate range of 30 megabits per second (Mbps) to 3 GPS and (3) Off-peak have a rate range of less than 30 Mbps. Based on the currently measure traffic rate, the network device dynamically sets the sampling rate configuration value for the interface to the prescribed corresponding sampling rate, i.e., 1000, 50 or 10 in this example, where the defined sampling rate configuration values of 1000, 50 or 10 represent the number of packets received per each sampled packet. As such, the network device adjusts the sampling rate in accordance to the current traffic rate. As described herein, notifications (e.g., SNMP traps) will be sent to flow collector 16 accordingly to update the flow collector as to the present sampling rate on an interface.

TABLE 1

| Zone | Current Traffic Rate | Sampling Rate |
|---|---|---|
| Peak | <3 Gbps | 1000 |
| Normal | 30 Mbps-3 Gbps | 50 |
| Off-peak | <30 Mbps | 10 |

The configuration data shown in Table 1 is shown for purposes of example. In some example implementations the configuration data may be preset by a manufacture of the network device based on the physical configuration and capabilities of the device. Moreover, the network element may present the configuration data to an administrator or other user so as to allow the user to define zones and specify traffic rate ranges and corresponding sampling rates.

In a second example implementation, one or more of network elements 14 applies a completely automatic and dynamic sampling rate variation without regard to prescribed traffic rate zones. Network elements 14 may, for example, apply the techniques described herein to compute, based on the current traffic rate, a sampling rate for the respective interfaces of the network element. Moreover, the network elements may compute the sampling rates based on defined policies, such as policies specified to maximize the utilization of the resources and capabilities of each of network elements 14. Network elements 14 may, for example, base the calculations on the total sampled packets per second being processed by flow components within the network elements and the maximum packet flows the network element may accommodate.

To illustrate, each network element 14 may compute a current sampling rate for an interface based on user configurable data that specifies: (1) target utilization for sampling resources within each network element 14 including total aggregate sampled packets per second generated and total sampled packet flows, (2) a threshold amount of change, in terms of packet per second, detected for a given interface at which to trigger an update to the sampling rate, and (3) a maximum frequency at which to change a sampling rate for a given interface, i.e., a maximum number of sampling rate changes for a given time interval or a minimum time interval between sampling rate changes for a given interface.

Figure 2:
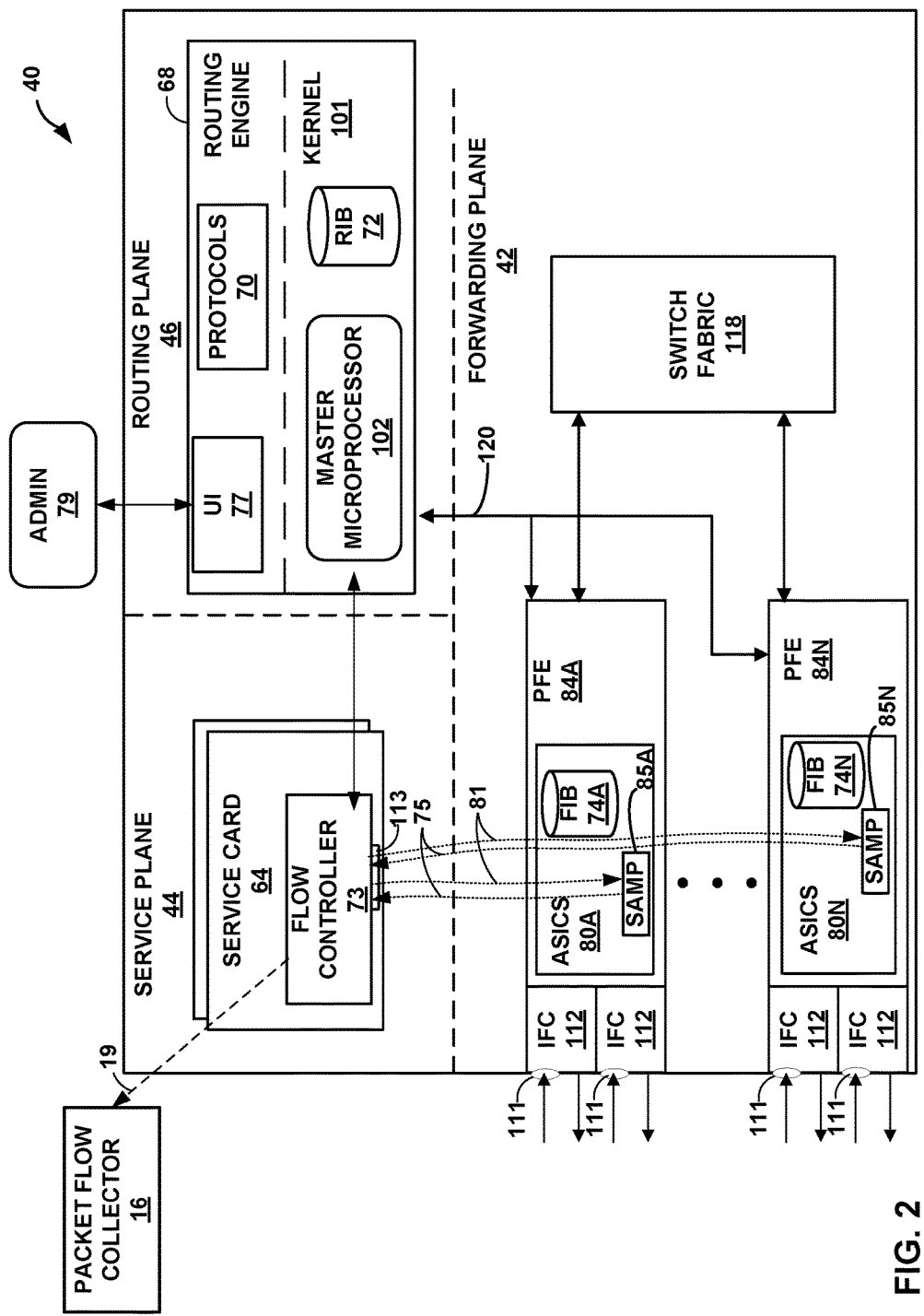
FIG. 2 is a block diagram illustrating example implementation of a router in accordance with the techniques described herein.

FIG. 2 is a block diagram illustrating a router 40 that provides adaptive, traffic-aware sampling rate adjustment in accordance with the principles of the invention. Router 40 may, for example, represent any of network elements 14 of FIG. 1. In this example, the components of router 40 may logically be viewed as comprising routing plane 46, forwarding plane 42 and service plane 44. As such, routing and services are integrated within a single router 40 that uses a shared forwarding plane 42 suitable for high-speed forwarding functions required by routers that process high-volume traffic.

Service plane 44 includes one or more services cards 64 that apply various services including flow record generation as described in FIG. 1. Service cards 64 may be installed along a backplane or other interconnect of router 40 to perform a variety of services on the packets received from forwarding engine 46, such as sampling, filtering, logging, Intrusion Detection and Prevention (IDP) analysis, virus scanning, deep packet inspection.

For example, as shown in FIG. 1, service card 64 implements flow controller 73, which may process messages 75 from sampling units 85 to generate traffic flow records 19, where messages 75 may encapsulate sampled packets received from inbound interfaces 111. Flow controller 85 transmits the traffic flow records to flow collector 16. As described herein, flow controller 73 controls sampling units 85 of forwarding plane 42 so as to provide traffic-aware sampling rate adjustment. Although FIG. 2 shows only a single flow controller 73 within a single service card 64, multiple service cards may implement flow controllers that operated in a coordinated, distributed fashion.

Forwarding plane 42 of router 80 includes a plurality of packet-forwarding engines 84A-84N ("PFEs 84") and a switch fabric 118 that collectively provide a data plane for forwarding network traffic. PFEs 84 receive and send data packets via interface cards 112 ("IFCs 112"). In other embodiments, each of PFEs 84 may comprise more or fewer IFCs. Although not shown, PFEs 84 may each comprise a central processing unit (CPU) and a memory. In this example, routing engine 68 of routing plane 42 is connected to each of PFEs 84 by a dedicated internal communication link 120. For example, dedicated link 120 may comprise a Gigabit Ethernet connection. Switch fabric 118 provides a high-speed interconnect for forwarding incoming data packets between PFEs 84 for transmission over a network. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing plane 42 includes routing engine 68 that provides an operating environment for execution of various protocols 70 that may comprise software processes having instructions executed by a computing environment. As described in further detail below, protocols 89 provide control plane functions for updating routing information base (RIB) 72 to reflect the current topology of a network and other network entities to which it is connected. RIB 72 may take the form of routing tables or other structures, executing routing protocols to communicate with peer routing devices and maintain and update the routing tables, and providing management interface(s) to allow user access and configuration of router 40. Routing engine 68 may be implemented solely in software, or hardware, or may be implemented as a combination of software, hardware or firmware. For example, routing engine 68 may include one or more processors which execute software instructions. In that case, routing engine 68 may include various software modules or daemons (e.g., one or more routing protocol processes, user interfaces and the like), and routing engine 68 may include a computer-readable storage medium, such as computer memory or hard disk, for storing executable instructions.

In accordance with RIB 72, routing engine 68 generates forwarding information and communicates the forwarding into each of PFEs 84 as forwarding information base (FIB)

74 to control forwarding of traffic within forwarding plane 42. In some instances, routing engine 68 may derive separate and different software FIBs for each respective PFEs 84. PFEs 84 include application-specific integrated circuits (ASICs 80) that are programmed with FIB 74.

For example, kernel 101 executes on master microprocessor 102 and may comprise, for example, a UNIX operating system derivative such as Linux or Berkeley Software Distribution (BSD). Kernel 101 processes kernel calls from protocols 70 to generate forwarding information based on the network topology represented in RIB 72, i.e., performs route resolution and path selection. Typically, kernel 101 generates the forwarding information in the form of radix or other lookup trees to map packet information (e.g., header information having destination information and/or a label stack) to next hops and ultimately to interface ports of interface cards associated with respective PFEs 84. Forwarding information may associate, for example, network destinations with specific next hops and corresponding IFCs 112.

Master microprocessor 102 executing kernel 101 programs PFEs 84 to install FIBs 74. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 80 are microcode-controlled chipsets (i.e., forwarding circuits) programmably configured by a slave microprocessor executing on each of PFEs 84. When forwarding packets, control logic with each ASIC 80 traverses the forwarding information (FIB 106) received from routing engine 68 and, upon reaching a FIB entry for the packet (e.g., a leaf node), automatically selects a forwarding next hop and processes the packets in accordance with the operations defined within the next hop.

In this way, ASICs 80 of PFEs 84 process packets by performing a series of operations on each packet over respective internal packet forwarding paths as the packets traverse the internal architecture of router 80. Operations, including sampling operations, may be performed, for example, on each packet based on any of a corresponding ingress interface, an ingress PFE 84, an egress PFE 30, an egress interface or other components of router 80 to which the packet is directed prior to egress, such as one or more service cards. PFEs 84 each include forwarding structures that, when executed, examine the contents of each packet (or another packet property, e.g., incoming interface) and on that basis make forwarding decisions, apply filters, and/or perform accounting, management, traffic sampling and load balancing, for example.

In one example, each of PFEs 84 arranges forwarding structures as next hop data that can be chained together as a series of "hops" along an internal packet forwarding path for the network device. In many instances, the forwarding structures perform lookup operations within internal memory of ASICs 80, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 80 determines the manner in which a packet is forwarded or otherwise processed by PFEs 84 from its input interface on one of IFCs 112 to its output interface on one of IFCs 112.

In this example, each forwarding ASIC 80 includes a sampling unit 85 that operate to sample inbound packets on interfaces 111 in accordance with a sample rate for the interface on which a given packet was received. As shown in FIG. 2, flow controller 73 outputs control messages 81 to configure each sampling unit 85. For example, flow controller 73 may communicate sample rates to be applied to inbound packets received on interfaces 111. In addition, flow controller 73 may output control messages 81 so as to communicate a threshold maximum amount of change for inbound traffic rates, i.e., Max_Change, that would trigger an automated update to the sampling rate for a given interface 111. In some examples, a common threshold change in traffic rate is used for all interfaces 111. In other examples, the threshold change in traffic rate for triggering a change in sampling rate may be defined by administrator 79 on a per interface 111 basis. Responsive to the configured sampling rates, sampling units 85 sample packets received from interfaces 111 and redirect any sampled packets to flow controller 73 of service plane 44, as shown as messages 75. Furthermore, sampling units 85 may output messages 75 to inform flow controller 73 as to actual traffic rates experienced on interfaces 111.

Flow controller 73 processes the sampled packets 75 to generate traffic flow records 19 and transmits the traffic flow records to flow collector 16. As described herein, flow controller 73 monitors messages 75 for indications as to changes in actual traffic rates experienced by interfaces 111 throughout distributed forwarding plane 42 and adaptively updates the sampling rates applied by sampling units 85 so as to provide adaptive, traffic-aware sampling in a manner to utilizes overall resources of router 40 in accordance with configuration specified by administrator 79.

User interface 77 provides an interface by which an administrator 79 or other management entity may modify the configuration of router 40. User interface 77 may, for example, provide a command line interface for text-based commands. As another example, user interface may provide a Simple Network Management Protocol interface receives SNMP commands from a management entity to set and retrieve configuration and management information for router 40. Using user interface 77, management entities may enable/disable and configure services, install routes, enable/disable and configure services provided by service plane 44 including traffic sampling implemented by flow controller 73, and configure interfaces, for example. In response to input received via UI 77, master processor 102 configures flow controller 73. For example, as explained in further detail below, flow controller 73 receives flow sampling configuration data for controlling adaptive sampling rate adjustments implemented by sampling units 85.

Router 40 may further include a physical chassis (not shown) for housing the components shown in FIG. 1. The chassis has a number of slots (not shown) for receiving a set of removable cards, including PFEs 84 and service cards 64. Each card may be inserted into a corresponding slot of the chassis for electrically coupling the card to routing plane 46 and forwarding plane 42 via a bus, backplane, or other electrical communication mechanism.

Router 40 may operate according to executable instructions fetched from a computer-readable storage medium (not shown). Examples of such media include random access memory (RAM), read-only memory (ROM), non-volatile random access memory (NVRAM), electrically erasable programmable read-only memory (EEPROM), flash memory, and the like. The functions of router 40 may be implemented by executing the instructions of the computer-readable storage medium with one or more processors, discrete hardware circuitry, firmware, software executing on a programmable processor, or a combination of any of the above.

Figure 3:
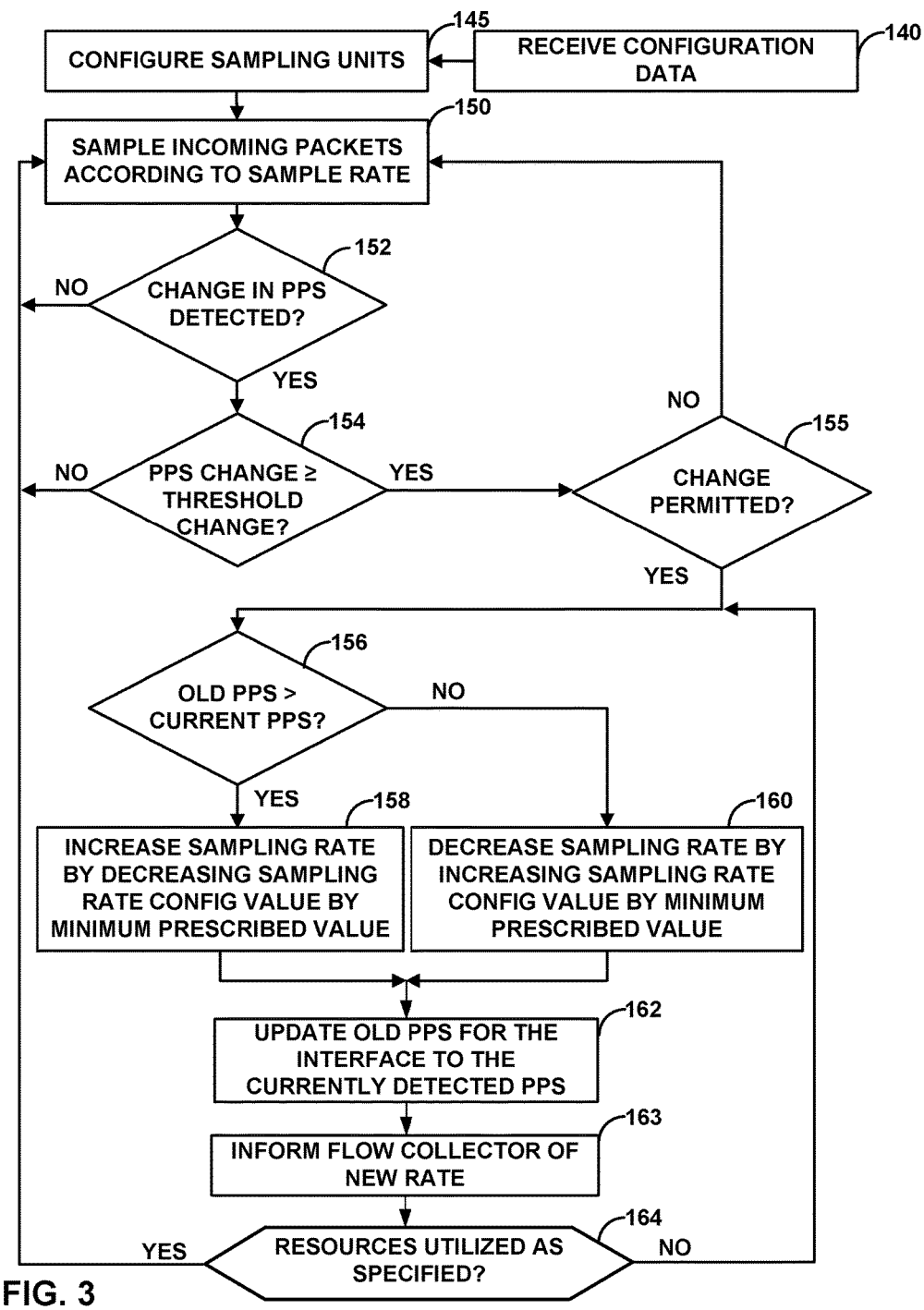
FIG. 3 is a flowchart in accordance with the techniques described herein.

FIG. 3 is a flowchart illustrating example operation of a network device, such as any of network elements 14 of FIG. 1 or router 40 of FIG. 2, in accordance with the techniques described herein. Moreover, FIG. 3 illustrates only one example implementation in which router 40 provides a completely automatic and dynamic sampling rate variation without regard to prescribed traffic rate zones. For purposes of illustration, FIG. 3 is described in reference to router 40 of FIG. 2.

Initially, flow controller 73 receives flow sampling configuration data (140). For example, flow controller 73 may receive flow sampling configuration data from administrator 79 via a command line or graphical user interface 77. As another example, flow controller 73 may receive flow sampling configuration data from a network management system, from an automated script or from another network device, such as a router.

One example implementation of the flow sampling configuration data is specified below in Table 2.

TABLE 2

| | |
|---|---|
| Max_Change | A threshold maximum amount of change in input packet per second (PPS) for an interface for triggering an update to the sampling rate. As one example, Max_Change = 5 PPS. |
| Max_Freq | A maximum frequency at which a sampling rate for a given interface can be changed, i.e., a maximum number of sampling rate changes for a given time interval or a minimum time interval between sampling rate changes for a given interface. |
| Max_PPS | A threshold maximum packet per second (PPS) for flow collection from all interfaces of the router. As one example, Max_PPS = 5000 PPS. |
| Max_Flows | A threshold maximum amount of flows the device for flow collection for all interfaces. As one example, Max Flows = 1000. |

In accordance with the configuration data, flow controller 73 outputs control messages 81 to configure each sampling unit 85 (145). For example, flow controller 73 outputs control messages 81 to PFEs 84 so as to communicate initial sampling rates to be applied to interfaces 111. In addition, flow controller 73 may communicate a threshold maximum amount of change (Max_Change) for triggering an automated update to the sampling rate. In some examples, flow controller 73 uses a common threshold change in traffic rate for all interfaces. In other examples, the threshold change in traffic rate for triggering a changing in sampling rate may be defined by administrator 79 on a per interface basis.

In addition, flow controller 73 may also configure each sampling unit 85 with a respective initial sampling configuration value so as to set an initial sampling rate for each interface 111. Flow controller 73 may configure each of sampling units 85 with the same default sampling rate, which may be specified by the configuration data received from administrator 79. In other example, flow controller 73 computes the initial sampling rate based on the flow sampling configuration data.

In operation, sampling units 85 of router 40 receive inbound packets on interfaces 111 and sample packets in accordance with a specified sample rate (100). While processing inbound packets, each of sampling units 85 monitors for changes in the rate at which inbound packets are received (152) and determines whether any change in the rate exceeds the defined threshold rate changed, i.e., Max_Change (154). That is, each sampling unit 85 may compare the currently rate at which traffic is received on a given interface (e.g., CURR_PPS) to a previously record rate for the interface (e.g., OLD_PPS). If no change in the rate of incoming packets has been detected (NO of 152) or any change is below the defined threshold (NO of 154), then sampling unit 85 continues to sample incoming packets at the currently defined sampling rate (150).

If the change in the receive rate for incoming packets on the interface exceeds the defined threshold (YES of 154), the sampling unit 85 detecting the change on one of its input interfaces outputs a message 75 to flow controller 73 of service plane 44 to indicate that a change has been detected that exceeds the defined threshold. At this time, the one of sampling units 85 experiencing the change in traffic may inform flow controller 73 as to the new traffic rate currently being received on the interface (Input_PPS).

In response, flow controller 73 determines whether an automated update to the sampling rate is permitted or whether an update to the sampling rate would exceed the maximum frequency (Max_Freq) specified by the user for which a sampling rate for a given interface can be changed (155). If an update to the sampling rate is not permitted (NO of 155), flow controller 73 does not initiate an automated update of the sampling rate and sampling units 85 continue to sample traffic at the current sampling rates.

If an update to the sampling rate is permitted (YES of 155), flow controller 73 determines whether the receive rate for the interface has increased (NO of 156) or decreased (YES of 156) from the traffic previously reported by the respective one of sampling units 85. In the event the rate at which packets are being received has increased and such rate changes exceeds the threshold change, flow controller 73 outputs a message 81 instructing the respective sampling unit 85 to increase the sampling rate configuration value by a minimum prescribed unit (160), which in turn causes the sampling unit to sample less frequently with respect to the received packets. For example, flow controller 73 may increase the sampling rate configuration value from 50 to 1000, which means that 1 out of every 1000 packets is sampled rather than 1 out of every 50. In the event the rate at which packets are being received has decreased and such rate change exceeds the threshold change, flow controller 73 outputs a message 81 directing the respective sampling unit 85 to decrease the sampling rate configuration value by a minimum prescribed unit (158), which in turn causes the sampling unit to sample more frequently with respect to the received packets. For example, flow controller 73 may decrease the sampling rate configuration value from 50 to 10, which means that 1 out of every 10 packets is sampled rather than 1 out of every 50.

In one example, flow controller 73 calculate the minimum prescribed unit (Min_Pres_Unit) for increasing or decreasing the sampling rate configuration value of a given interface based on the current traffic rate for the interface (Input_PPS) and the threshold maximum packet per second (PPS) for flow collection from all interfaces of the router (Max_PPS) as follows:

$$\text{Min\_Pres\_Unit} = \lceil \text{Input\_PPS}/\text{Max\_PPS} \rceil,$$

where Min_Pres_Unit is rounded up to the greatest integer number return. For example, if the current traffic rate for the interface is 10000 PPS and the threshold maximum packets per second for flow collection from all interfaces is 1000 PPS, then the minimum prescribed unit for increasing or decreasing the sampling rate for the given interface is calculated as 10. In this way, the minimum prescribed unit is computed based on the current traffic rate of the interface relative to the specified threshold maximum packets per second for flow collector 73 can receive packets on interface 113.

Upon receiving message 81 and adjusting the sampling rate, the sampling unit 85 receiving the message updates a variable that stored the prior packet rate (e.g., OLD_PPS) to reflect the packet rate for the interface (e.g., CURR_PPS) (162).

Upon directing one of sampling units 85 to adjust the sampling rate for a given interface 111, flow controller 73 records the current traffic rate for the interface (162) and informs flow collector 16 of the new sampling rate for the interface (163). As a result, flow collector 16 is able to scale the flow records for a given interface correctly and construct accurate representations and analysis of traffic flows with respect to time. As described, flow controller 73 may output a communication, such as an SNMP trap, to packet flow collector 16 so as to inform the packet flow collector as to the new sampling rate configuration value and the particular interface. Alternatively, each of sampling units 85 may construct and output communications directly to flow collector 16 so as to inform the flow collector 16 of the adjusted sampling rate.

After adjusting the sampling rate, flow controller 73 determines whether the flow sampling resources of router 40 are being utilized in accordance with the utilization thresholds (e.g, Max_Flows and Max_PPS) defined by administrator 79 (164).

For example, in the event that actual traffic flow for an interface has decreased (YES of 156) and triggered an increase in the sampling rate (158), flow controller 73 may determine whether the aggregate rate ("Exec_PPS") at which sampled traffic is being received by flow controller 73 from sampling units 85 on interface 113 is still less the defined threshold maximum rate of sampled traffic (Max_PPS) for interface 113 and that the number of packet flows within the sampled packets is still less the threshold maximum number of flows (e.g., Max_Flows) specified for router 40. If so, flow controller 73 repeatedly increases the sampling rate (158, 162, 163) until utilization is achieved.

In the event that actual traffic flow for an interface has increased (NO of 156) and triggered a decrease in the sampling rate (160), flow controller 73 may determine whether the aggregate rate ("Exec_PPS") at which sampled traffic is being received by flow controller 73 from sampling units 85 and forwarded to flow collector 16 on interface 113 still exceeds the defined threshold maximum rate of sampled traffic (Max_PPS) or whether the number of packet flows within the sampled packets still exceeds the threshold maximum number of flows (e.g., Max_Flows) specified for router 40. If so, flow controller 73 repeatedly decreases the sampling rate (160, 162, 163) until proper utilization is achieved and the sampling resources are not over subscribed. In this way, sampling rate updates for sampling units 85 within distributed forwarding plane 42 may be automatically update in a traffic-aware fashion and in a manner that is based on actual aggregate traffic rate and packet flows experienced by one or more flow controllers 73 via interface 113 in view of user specified threshold maximums.

Various embodiments of the invention have been described. These and other embodiments are within the scope of the following claims.

The invention claimed is:

1. A network device comprising:
a packet forwarding engine comprising:
a plurality of interfaces configured to send and receive packets,
a forwarding integrated circuit to switch packets between the interfaces, and
a sampling unit to sample inbound packets received on the interfaces in accordance with sampling rates for the interfaces;
a service plane having at least one service card, the service card having a flow controller that receives sampled packets from the sampling unit and generates flow records in accordance with sampled packets,
wherein the sampling unit monitors for changes in current packet rates at which the inbound packets are received on the interfaces of the packet forwarding engine and outputs messages informing the flow controller upon detecting changes in the current packet rates for the inbound packets on any of the interfaces that exceeds a threshold change in rate, and
wherein, responsive to receiving a message indicating a change in rate for the inbound packets for one of the interfaces, the flow controller within the service plane computes an updated sampling rate for the interface for which the change in rate was detected and outputs a message to the packet forwarding engine to adjust the sampling rate applied by the sampling unit to the respective interface.

2. The network device of claim 1,
wherein the flow controller determines a current aggregate packet rate at which the sampled packets are received at an interface of the service card, and
wherein, responsive to the message indicating the change in rate, the flow controller repeatedly adjusts the sampling rate by a minimum unit until the current aggregate packet rate satisfies a defined threshold aggregate packet rate.

3. The network device of claim 2, wherein the flow controller repeatedly adjusts the current sampling rate until a number of packet flows within the sampled packets satisfies a defined threshold number of packet flows.

4. The network device of claim 3, further comprising a user interface by which a user specifies:
the threshold aggregate packet rate at which the sampled packets from the plurality of forwarding circuits may be received by the flow controller of the service card,
the threshold number of packet flows that may be received by the flow controller from the sampling unit, and
the threshold change in rate to trigger the update to the sampling rate for any of the interfaces.

5. The network device of claim 2, wherein the flow controller computes the minimum unit as a function of the current packet rate of the interface for which the change was detected relative to the threshold aggregate packet rate for receiving the sampled packets at the flow controller.

6. The network device of claim 2, further comprising a computer-readable storage device storing configuration data specifying a plurality of traffic rate zones and, for each of the traffic rate zones, a respective sampling rate,
wherein when computing an updated sampling rate the flow controller accesses the configuration data, selects, based on the detected change in the current packet rate, one of the traffic rate zone representative of the current packet rate after the change, and adjusts the sampling rate to be the sampling rate defined for the selected traffic rate zone.

7. The network device of claim 1, wherein the network device comprises a network router.

8. A method comprising:
receiving, with a network device and at a current packet rate, inbound packets at an interface of the network device;
sampling the inbound packets with a sampling unit of a forwarding circuit of the network device at a current sampling rate to direct a subset of the inbound packets to a service card of the network device;
processing, with a flow controller within the service card of the network device, the subset of the inbound packets to generate flow records;
responsive to a change in the current packet rate at which the inbound packets are received at the interface, repeatedly adjusting the current sampling rate at which the forwarding circuit samples the inbound packets received at the interface by a minimum unit until the current sampling rate satisfies a defined threshold packet rate.

9. The method of claim 8, further comprising:
monitoring, with the forwarding circuit, the current packet rate at which the inbound packets are received at the interface; and
detecting, with the forwarding circuit, a change in the current packet rate that exceeds a specified threshold amount of change;
outputting a message from the forwarding circuit to a service card of the network device to indicate the detected change; and
computing a new sampling rate for the interface with the service card by adjusting the current sampling rate according to the minimum unit; and
outputting a message from the service card to the forwarding circuit to program the adjust the new sampling rate into the forwarding circuit.

10. The method of claim 9, further comprising:
receiving, with a flow controller executing on the service card, sampled packets from a plurality of forwarding circuits, wherein the sampled packets comprise subsets of packets received on a plurality of interfaces of the forwarding circuits;
determining, with the flow controller, a current aggregate packet rate at which the sampled packets are received from the plurality of forwarding circuit at an interface of the service card; and
repeatedly adjusting the current sampling rate by the minimum unit until the current aggregate packet rate for the sampled packets from the plurality of forwarding circuits satisfies a defined threshold aggregate packet rate.

11. The method of claim 10, wherein repeatedly adjusting the current sampling rate comprises repeatedly adjusting the current sampling rate until a number of packet flows within the sampled packets from the plurality of forwarding circuits satisfies a defined threshold number of packet flows.

12. The method of claim 10, further comprising computing the minimum unit as a function of the current packet rate relative to the threshold aggregate packet rate for receiving the sampled packets at the flow controller from the plurality of forwarding circuits of the network device.

13. A method comprising:
receiving, with a network device and at a current packet rate, inbound packets at an interface of the network device;
sampling the inbound packets with a sampling unit of a forwarding circuit of the network device at a current sampling rate to direct a subset of the inbound packets to a service card of the network device;
processing, with a flow controller within the service card of the network device, the subset of the inbound packets to generate flow records; and
responsive to a change in the current packet rate at which the inbound packets are received at the interface:
accessing configuration data specifying a plurality of traffic rate zones and, for each of the traffic rate zones, a range of traffic rates associated with the traffic rate zone and a respective target sampling rate,
selecting, based on the detected change in the current packet rate, one of the traffic rate zones representative of the current packet rate after the change, and
adjusting the current sampling rate at which the forwarding circuit samples the inbound packets received at the interface according to the respective target sampling rate specified for the selected traffic rate zone.

* * * * *